(12) United States Patent
Lord

(10) Patent No.: US 6,413,038 B1
(45) Date of Patent: Jul. 2, 2002

(54) WINDMILL

(76) Inventor: Donald Lord, 912 E. Boone St., Santa Maria, CA (US) 93454

(*) Notice: Subject to any disclaimer, the term of this patent is extended or adjusted under 35 U.S.C. 154(b) by 0 days.

(21) Appl. No.: 09/705,655

(22) Filed: Nov. 3, 2000

(51) Int. Cl.[7] .................................................. F03D 7/00
(52) U.S. Cl. .................. 415/4.2; 415/122.1; 415/213.1; 416/244 R
(58) Field of Search ........................ 415/4.2, 4.4, 907, 415/2.1, 122.1, 213.1, 141, 4.1; 416/110, 111, 119, 170 R, 244 R; 52/146, 651.01, 152

(56) References Cited

U.S. PATENT DOCUMENTS

| | | | |
|---|---|---|---|
| 223,308 A | * 1/1880 | Barker | 416/119 |
| 320,190 A | * 6/1885 | Stoddard | 415/141 |
| 376,357 A | * 1/1888 | Weeks | 415/146 |
| 1,718,682 A | * 6/1929 | Bruce | 416/15 |
| 4,004,861 A | 1/1977 | Soules | |
| 4,142,827 A | 3/1979 | Vinciguerra | |
| 4,203,707 A | 5/1980 | Stepp | |
| 4,406,584 A | 9/1983 | Stepp | |
| 4,776,762 A | 10/1988 | Blowers, Sr. | |
| D342,074 S | 12/1993 | Burns | |

OTHER PUBLICATIONS

Jack Par, The wind power book; 1981, Published by Chesire Books, p. 101.*

* cited by examiner

Primary Examiner—F. Daniel Lopez
Assistant Examiner—Kimya N McCoy

(57) ABSTRACT

A windmill for efficiently catching wind for turning an axle. The windmill includes a support structure. The support structure includes a plurality of generally vertically orientated posts. Each of the posts is spaced from each other. Each of the posts has a top edge. A covering is positioned on and is securely coupled to each of the top edge of the posts. A first axle is elongate and has a first end rotatably coupled to a bottom surface of the covering. The first axle has an upper portion and a lower portion. Each of a plurality of vanes is comprised of a top arm, a bottom arm and an end portion. Each of the arms has a first end securely attached to the upper portion of the first axle and a second end securely attached to an opposite end of the end portion such that a frame is defined. Each of a plurality of panels is substantially rigid and has a front side, a back side, a top edge, a bottom edge, a first side edge and a second side edge. Each of the top edges is hingedly coupled to one of the top arms and each of the bottom edges is hingedly coupled to a bottom arm by a plurality of hinging means. Each of the panels is spaced such that a front side of a panel may abut a back side of a next adjacent panel. The panels may selectively move between an open position and a closed position.

5 Claims, 3 Drawing Sheets

WINDMILL

BACKGROUND OF THE INVENTION

1. Field of the Invention

The present invention relates to windmills and more particularly pertains to a new windmill for efficiently catching wind for turning an axle.

2. Description of the Prior Art

The use of windmills is known in the prior art. More specifically, windmills heretofore devised and utilized are known to consist basically of familiar, expected and obvious structural configurations, notwithstanding the myriad of designs encompassed by the crowded prior art which have been developed for the fulfillment of countless objectives and requirements.

Known prior art includes U.S. Pat. Nos. 4,004,861; 4,406,584; 4,776,762; 4,203,707; 4,142,827; and U.S. Des. Pat. No. 342,074.

While these devices fulfill their respective, particular objectives and requirements, the aforementioned patents do not disclose a new windmill. The inventive device includes a support structure. The support structure includes a plurality of generally vertically orientated posts. Each of the posts is spaced from each other. Each of the posts has a top edge. A covering is positioned on and is securely coupled to each of the top edge of the posts. A first axle is elongate and has a first end rotatably coupled to a bottom surface of the covering. The first axle has an upper portion and a lower portion. Each of a plurality of vanes is comprised of a top arm, a bottom arm and an end portion. Each of the arms has a first end securely attached to the upper portion of the first axle and a second end securely attached to an opposite end of the end portion such that a frame is defined. Each of a plurality of panels is substantially rigid and has a front side, a back side, a top edge, a bottom edge, a first side edge and a second side edge. Each of the top edges is hingedly coupled to one of the top arms and each of the bottom edges is hingedly coupled to a bottom arm by a plurality of hinging means. Each of the panels is spaced such that a front side of a panel may abut a back side of a next adjacent panel. The panels may selectively move between an open position and a closed position.

In these respects, the windmill according to the present invention substantially departs from the conventional concepts and designs of the prior art, and in so doing provides an apparatus primarily developed for the purpose of efficiently catching wind for turning an axle.

SUMMARY OF THE INVENTION

In view of the foregoing disadvantages inherent in the known types of windmills now present in the prior art, the present invention provides a new windmill construction wherein the same can be utilized for efficiently catching wind for turning an axle.

The general purpose of the present invention, which will be described subsequently in greater detail, is to provide a new windmill apparatus and method which has many of the advantages of the windmills mentioned heretofore and many novel features that result in a new windmill which is not anticipated, rendered obvious, suggested, or even implied by any of the prior art windmills, either alone or in any combination thereof.

To attain this, the present invention generally comprises a support structure. The support structure includes a plurality of generally vertically orientated posts. Each of the posts is spaced from each other. Each of the posts has a top edge. A covering is positioned on and is securely coupled to each of the top edge of the posts. A first axle is elongate and has a first end rotatably coupled to a bottom surface of the covering. The first axle has an upper portion and a lower portion. Each of a plurality of vanes is comprised of a top arm, a bottom arm and an end portion. Each of the arms has a first end securely attached to the upper portion of the first axle and a second end securely attached to an opposite end of the end portion such that a frame is defined. Each of a plurality of panels is substantially rigid and has a front side, a back side, a top edge, a bottom edge, a first side edge and a second side edge. Each of the top edges is hingedly coupled to one of the top arms and each of the bottom edges is hingedly coupled to a bottom arm by a plurality of hinging means. Each of the panels is spaced such that a front side of a panel may abut a back side of a next adjacent panel. The panels may selectively move between an open position and a closed position.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new windmill apparatus and method which has many of the advantages of the windmills mentioned heretofore and many novel features that result in a new windmill which is not anticipated, rendered obvious, suggested, or even implied by any of the prior art windmills, either alone or in any combination thereof.

It is another object of the present invention to provide a new windmill which may be easily and efficiently manufactured and marketed.

It is a further object of the present invention to provide a new windmill which is of a durable and reliable construction.

An even further object of the present invention is to provide a new windmill which is susceptible of a low cost of manufacture with regard to both materials and labor, and which accordingly is then susceptible of low prices of sale to the consuming public, thereby making such windmill economically available to the buying public.

Still yet another object of the present invention is to provide a new windmill which provides in the apparatuses and methods of the prior art some of the advantages thereof, while simultaneously overcoming some of the disadvantages normally associated therewith.

Still another object of the present invention is to provide a new windmill for efficiently catching wind for turning an axle.

Yet another object of the present invention is to provide a new windmill which includes a support structure. The support structure includes a plurality of generally vertically orientated posts. Each of the posts is spaced from each other. Each of the posts has a top edge. A covering is positioned on and is securely coupled to each of the top edge of the posts. A first axle is elongate and has a first end rotatably coupled to a bottom surface of the covering. The first axle has an upper portion and a lower portion. Each of a plurality of vanes is comprised of a top arm, a bottom arm and an end portion. Each of the arms has a first end securely attached to the upper portion of the first axle and a second end securely attached to an opposite end of the end portion such that a frame is defined. Each of a plurality of panels is substantially rigid and has a front side, a back side, a top edge, a bottom edge, a first side edge and a second side edge. Each of the top edges is hingedly coupled to one of the top arms and each of the bottom edges is hingedly coupled to a bottom arm by a plurality of hinging means. Each of the panels is spaced such that a front side of a panel may abut a back side of a next adjacent panel. The panels may selectively move between an open position and a closed position.

Still yet another object of the present invention is to provide a new windmill that efficiently catches air by providing a wall that is orientated perpendicular to the flow of the wind which opens to let the air pass through when the wall, or vane, is moving against the wind.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
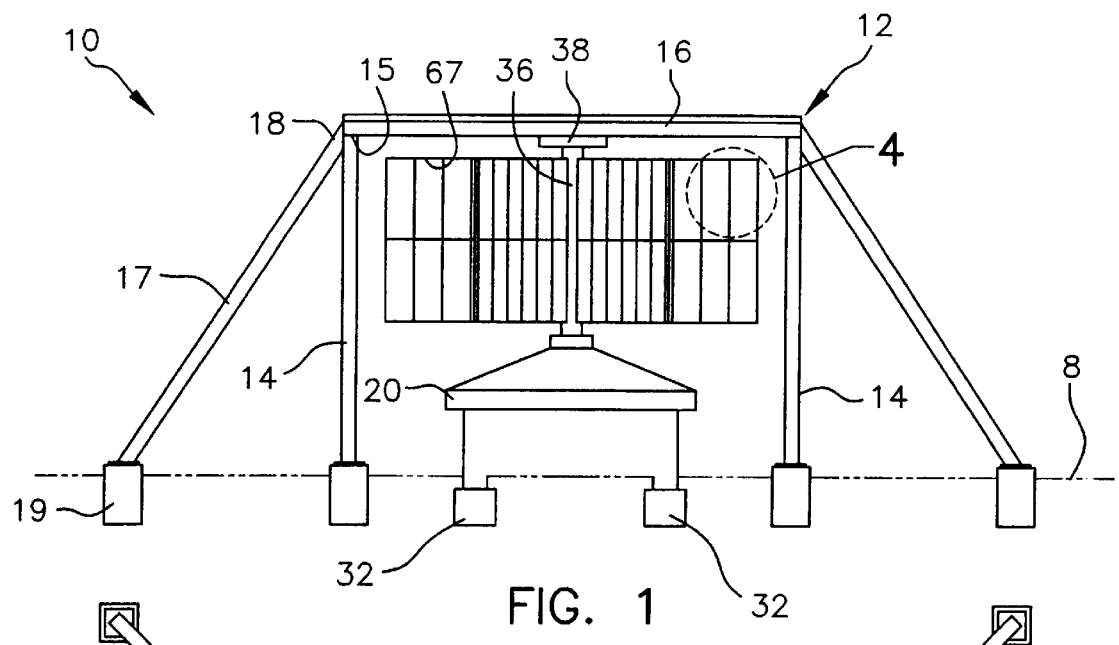
FIG. 1 is a schematic side view of a new windmill according to the present invention.
Figure 2:
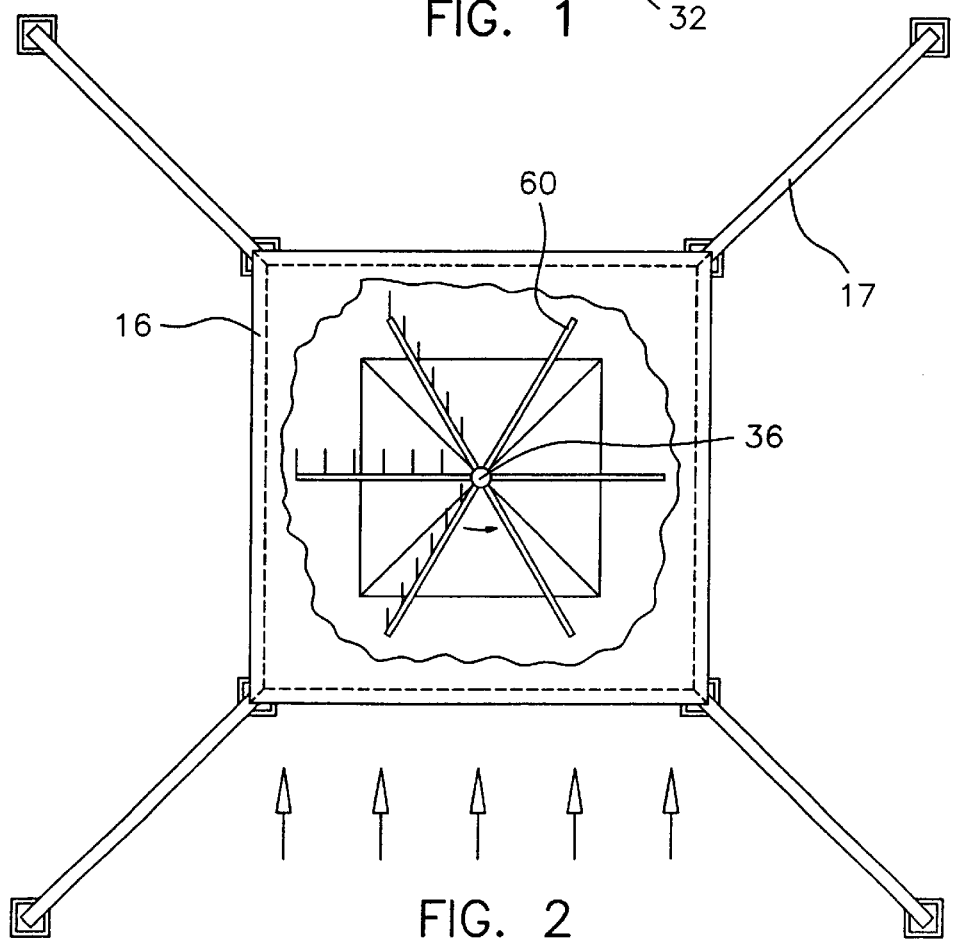
FIG. 2 is a schematic top view of the present invention.
Figure 3:
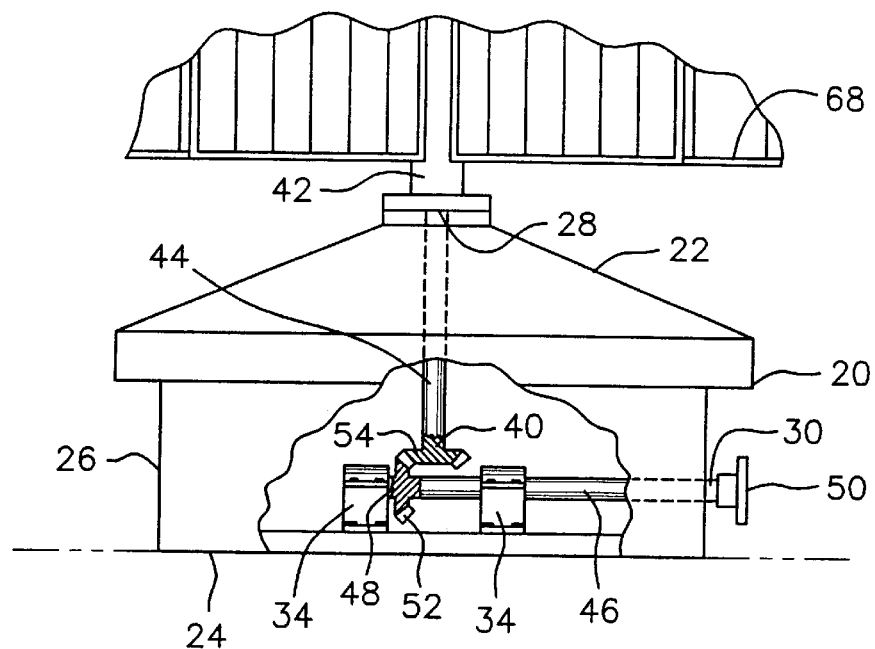
FIG. 3 is a schematic side view of the present invention.
Figure 4:
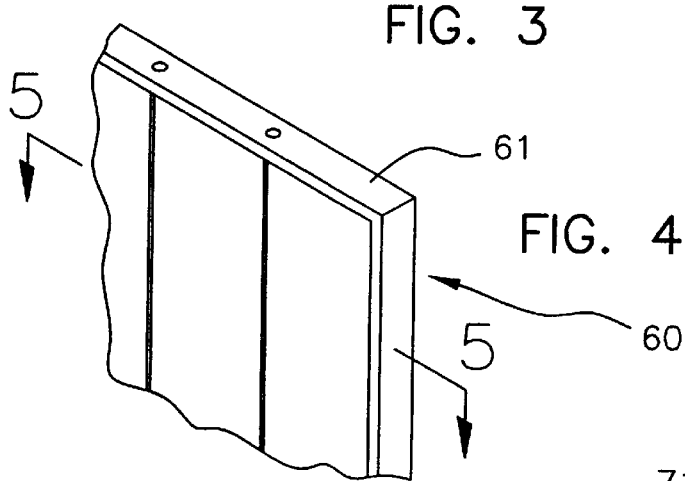
FIG. 4 is a schematic perspective view of a vane of the present invention.
Figure 5:
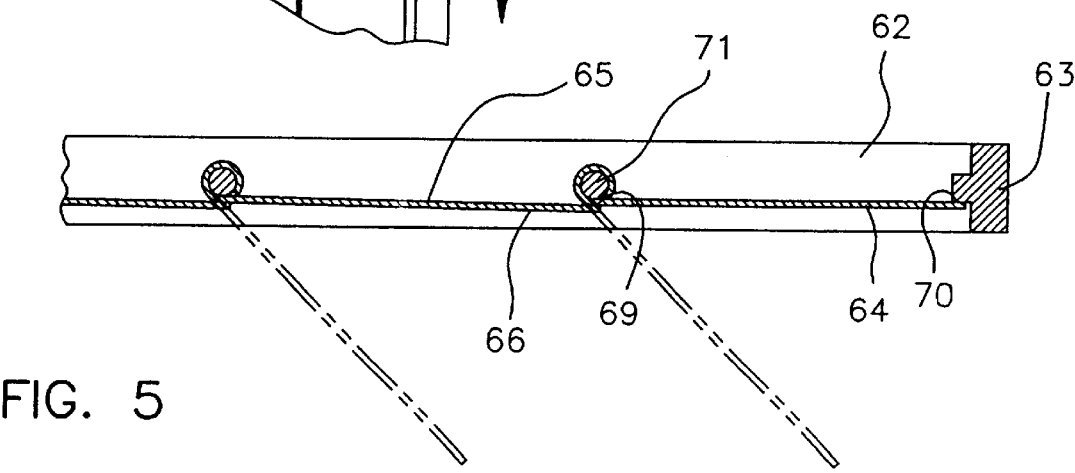
FIG. 5 is a schematic cross-sectional view taken along line 5—5 of the present invention.

With reference now to the drawings, and in particular to FIGS. 1 through 7 thereof, a new windmill embodying the principles and concepts of the present invention and generally designated by the reference numeral 10 will be described.

As best illustrated in FIGS. 1 through 7, the windmill 10 generally comprises a support structure 12. The support structure 12 preferably includes four generally vertically orientated posts 14. Each of the posts is spaced from each other and securely mounted in a ground surface 8. Each of the posts 14 has a top edge 15. A covering 16 is positioned on and securely coupled to each of the top edge 15 of the posts. The covering 16 is substantially rigid. Each of a plurality of bracing members 17 is elongate and has a first end 18 and a second end 19. Each of the first ends 18 is securely attached to one of the four posts 14. Each of the first ends 18 of the bracing members 17 is positioned adjacent to the top edge 15 of a respective post 14, and each of the second ends 19 of the bracing members 17 is securely mounted in the ground surface.

A gear house 20 has a top wall 22, a bottom wall 24 and a peripheral wall 26 extending therebetween. The gear house 20 is positioned under the covering 16. The top wall 22 has a hole 28 therethrough. The peripheral wall 26 has an opening 30 therein. The bottom wall 24 has a plurality of rods 32 securely coupled thereto and extending into the ground surface 8.

Each of a pair of bracket members 34 is securely coupled to an upper surface of the bottom wall 24 and spaced from each other.

A first axle 36 is elongate and has a first end 38 rotatably coupled to a bottom surface of the covering 16. The first axle 36 extends through the hole 28 in the top wall 22 of the gear housing 20 such that a second end 40 of the first axle 36 is positioned generally between the brackets 34. The first axle 36 has an upper portion 42 positioned outside of the gear housing 20 and a lower portion 44 positioned inside of the housing 20. The upper portion 42 has a diameter greater than a diameter of the hole 28.

A second axle 46 is elongate and has first end 48 and a second end 50. The first end 48 of the second axle 46 extends through a first of the brackets and into a second of the brackets. The second axle 46 is rotatably coupled to the brackets 34. The second end 50 of the second axle 46 extends through the opening 30 in the peripheral wall 26.

The second axle 46 extends through and is integrally coupled to a first gear 52. The first gear 52 is generally positioned between the brackets 34.

A second gear 54 is integrally coupled to the second end 40 of the first axle and is positioned to engage the first gear 52. Rotating the first axle 36 causes the second axle 46 to rotate.

Each of a plurality of vanes 60 comprises a top arm 61, a bottom arm 62 and an end portion 63. Each of the arms 61, 62 has a first end securely attached to the upper portion 42 of the first axle 36 and a second end securely attached to an opposite end of the end portion 63 such that a frame is defined.

Each of a plurality of panels 64 is substantially rigid and has a front side 65, a back side 66, a top edge 67, a bottom edge 68, a first side edge 69 and a second side edge 70. Each of the top edges 67 is hingedly coupled to one of the top arms 61 and each of the bottom edges 68 is hingedly coupled to one of the bottom arms 62 on the same vane 60 by a plurality of hinging means 71. Each of the hinging means 71 extends the length of a respective panel and is positioned adjacent to a respective first side edge 69. Each of the panels 64 is spaced such that a front side 65 of a panel 64 may abut a back side 66 of a next adjacent panel. The panels 64 may selectively move between an open position and a closed position. Each of the vanes 60 has a plurality of panels 64 hingedly coupled thereto.

Figure 6:
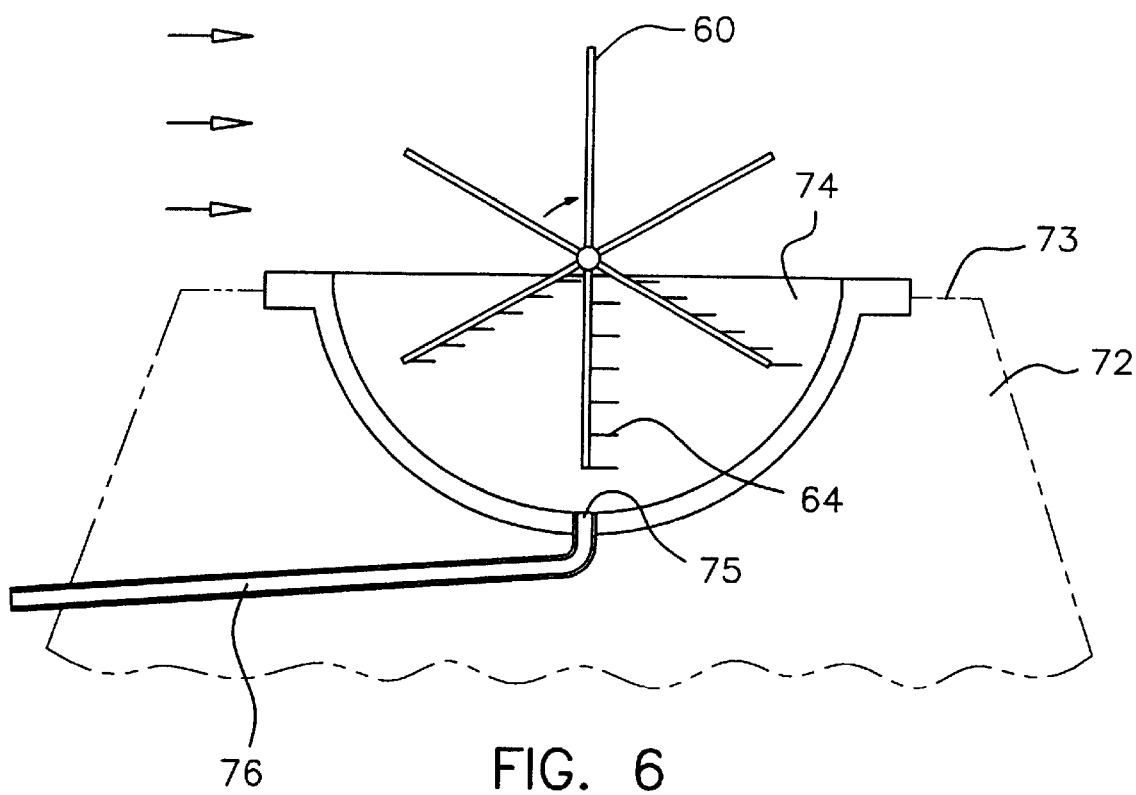
FIG. 6 is a schematic side view of the second embodiment of the present invention.
Figure 7:
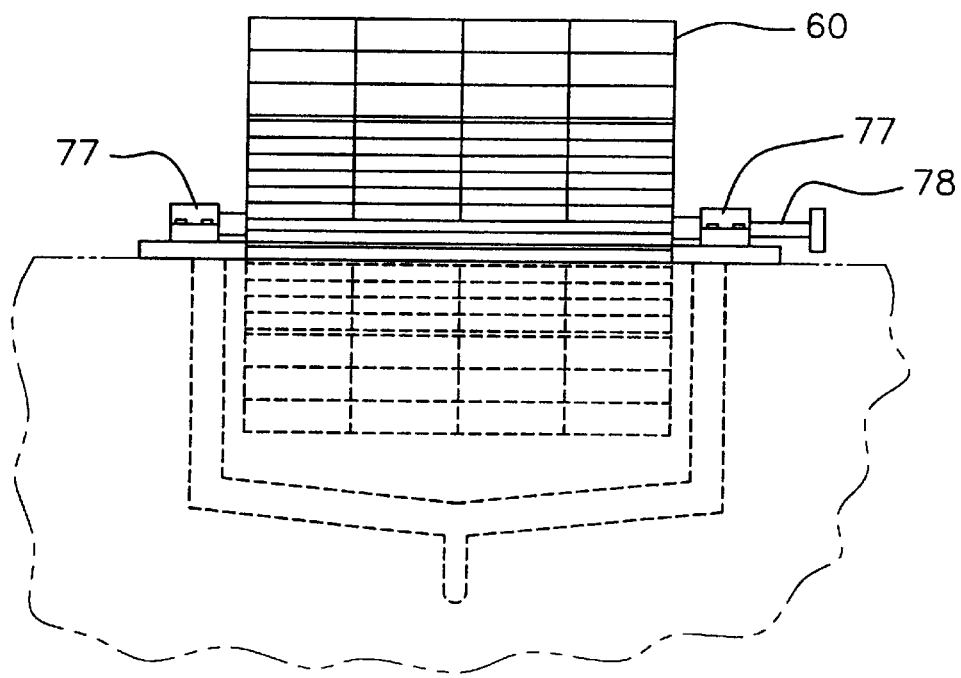
FIG. 7 is a schematic front view of the second embodiment of the present invention.

A second embodiment is shown in FIGS. 6 and 7 and includes a base member 72. The base member 72 has a top side 73 has a generally arcuate depression 74 therein in the shape of a half-cylinder.

A drainage hole 75 extends through a bottom most portion of the arcuate depression. A drainage pipe 76 is fluidly coupled to the drainage hole 75 and outwardly away from the base member to carry away any water that may accumulate in the depression.

Each of a pair of bracket members 77 is securely coupled to the top side 73 and positioned on either side of the depression 74.

An axle 78 is elongate and has first end and a second end. The axle 78 extends through and is rotatably coupled to each of the brackets 77. The vanes 60 and their associated panels 64 are coupled to the axle 78 as in the first embodiment shown in FIGS. 1 through 5. The first embodiment is vertically positioned and the second is horizontally. The second device is more useful on the western coast of the United States where the wind is generally directed in a first direction.

In use, the device is used as a conventional windmill, however it is capable of drawing more power from the wind because as the panels close, the vane becomes, in essence a solid wall with the ability to catch more air. As the first axle rotates, the wind causes the panels to open so that it may generally pass unimpeded through the vane. The axle may be mechanically coupled to generator, pump, or anything needed by the user.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A windmill device, said device comprising:
   a support structure, said support structure including a plurality of generally vertically orientated posts, each of said posts being spaced from each other, each of said posts having a top edge, a covering being positioned on and securely coupled to each of said top edge of said posts;
   a first axle, said first axle being elongate, said first axle having a first end rotatably coupled to a bottom surface of said covering, said first axle having an upper portion and a lower portion;
   a plurality of vanes, each of said vanes comprising a top arm, a bottom arm and an end portion, each of said arms having a first end securely attached to said upper portion of said first axle and a second end securely attached to an opposite end of said end portion such that a frame is defined;
   a plurality of panels, each of said panels being substantially rigid and having a front side, a back side, a top edge, a bottom edge, a first side edge and a second side edge, each of said top edges being hingedly coupled to one of said top arms and each of said bottom edges being hingedly coupled to a bottom arms by a plurality of hinging means, each of said panels being spaced such that a front side of a panel may abut a back side of a next adjacent panel, wherein said panels may selectively move between an open position and a closed position; and
   each of said vanes having a ridge portion, said ridge portion extending inwardly from said end portion of the associated one of said vanes, said second side edge of a outermost one of said panels coupled to the associated one of said abutting against said ridge portion of the associated one of said vanes for preventing the outermost one of said vanes from pivoting through the associated one of said vanes such that said panels are positioned within the perimeter of the associated one of said vanes when said panels are in a closed position.

2. The windmill device as in claim 1, said support structure further including:
   said plurality of posts being four posts, each of said posts being spaced from each other and securely mounted in a ground surface, a plurality of bracing members, each of said bracing members being elongate and having a first end and a second end, each of said first ends being securely attached to one of said four posts, each of said first ends of said bracing members being positioned adjacent to the top edge of a respective post, each of said second ends of said bracing members being securely mounted in the ground surface.

3. The windmill device as in claim 1, further including:
   a gear house, said gear house having a top wall, a bottom wall and a peripheral wall extending therebetween, said gear house being positioned under said covering, said top wall having a hole therethrough, said peripheral wall having an opening therein, said bottom wall having a plurality of rods securely coupled thereto and extending into the ground surface;
   a pair of bracket members, each of said bracket members being securely coupled to an upper surface of said bottom wall and spaced from each other;
   said first axle extending through said hole in said top wall of said gear housing such that said second end of said first axle is positioned generally between said brackets, said upper portion being positioned outside of said gear housing and said lower portion positioned inside of said gear housing;
   a second axle, said second axle being elongate and having first end and a second end, said first end of said second axle extending through a first of said brackets and into a second of said brackets, said second axle being rotatably coupled to said brackets, said second end of said second axle extending through said opening in said peripheral wall;

a first gear, said second axle extending through and being integrally coupled to said first gear, said first gear being generally positioned between said brackets; and a second gear, said second gear being integrally coupled to said second end of said first axle and positioned to engage said first gear, wherein rotating said first axle causes said second axle to rotate.

4. A windmill device, said device comprising:

a support structure, said support structure including four generally vertically orientated posts, each of said posts being spaced from each other and securely mounted in a ground surface, each of said posts having a top edge, a covering being positioned on and securely coupled to each of said top edge of said posts, said covering being substantially rigid, a plurality of bracing members, each of said bracing members being elongate and having a first end and a second end, each of said first ends being securely attached to one of said four posts, each of said first ends of said bracing members being positioned adjacent to the top edge of a respective post, each of said second ends of said bracing members being securely mounted in the ground surface;

a gear house, said gear house having a top wall, a bottom wall and a peripheral wall extending therebetween, said gear house being positioned under said covering, said top wall having a hole therethrough, said peripheral wall having an opening therein, said bottom wall having a plurality of rods securely coupled thereto and extending into the ground surface;

a pair of bracket members, each of said bracket members being securely coupled to an upper surface of said bottom wall and spaced from each other;

a first axle, said first axle being elongate, said first axle having a first end rotatably coupled to a bottom surface of said covering, said first axle extending through said hole in said top wall of said gear housing such that said second end of said first axle is positioned generally between said brackets, said first axle having an upper portion positioned outside of said gear housing and a lower portion positioned inside of said gear housing, said upper portion having a diameter greater than a diameter of said hole;

a second axle, said second axle being elongate and having first end and a second end, said first end of said second axle extending through a first of said brackets and into a second of said brackets, said second axle being rotatably coupled to said brackets, said second end of said second axle extending through said opening in said peripheral wall;

a first gear, said second axle extending through and being integrally coupled to said first gear, said first gear being generally positioned between said brackets;

a second gear, said second gear being integrally coupled to said second end of said first axle and positioned to engage said first gear, wherein rotating said first axle causes said second axle to rotate;

a plurality of vanes, each of said vanes comprising a top arm, a bottom arm and an end portion, each of said arms having a first end securely attached to said upper portion of said first axle and a second end securely attached to an opposite end of said end portion such that a frame is defined;

a plurality of panels, each of said panels being substantially rigid and having a front side, a back side, a top edge, a bottom edge, a first side edge and a second side edge, each of said top edges being hingedly coupled to one of said top arms and each of said bottom edges being hingedly coupled to a bottom arms by a plurality of hinging means, each of said hinging means being extending a length of a respective panel and being positioned adjacent to a respective first side edge, each of said panels being spaced such that a front side of a panel may abut a back side of a next adjacent panel, wherein said panels may selectively move between an open position and a closed position, wherein each of said vanes has a plurality of panels hingedly coupled thereto; and each of said vanes having a ridge portion, said ridge portion extending inwardly from said end portion of the associated one of said vanes, said second side edge of a outermost one of said panels coupled to the associated one of said abutting against said ridge portion of the associated one of said vanes for preventing the outermost one of said vanes from pivoting through the associated one of said vanes such that said panels are positioned within the perimeter of the associated one of said vanes when said panels are in a closed position.

5. A windmill device, said device comprising:

a base member, said base member having a top side having a generally arcuate depression therein;

a pair of bracket members, each of said bracket members being securely coupled to said top side and positioned on either side of said depression;

an axle, said axle being elongate and having first end and a second end, said axle extending through and being rotatably coupled to each of said brackets;

a plurality of vanes, each of said vanes comprising a top arm, a bottom arm and an end portion, each of said arms having a first end securely attached to said axle and a second end securely attached to an opposite end of said end portion such that a frame is defined;

a plurality of panels, each of said panels being substantially rigid and having a front side, a back side, a top edge, a bottom edge, a first side edge and a second side edge, each of said top edges being hingedly coupled to one of said top arms and each of said bottom edges being hingedly coupled to a bottom arms by a plurality of hinging means, each of said hinging means being extending a length of a respective panel and being positioned adjacent to a respective first side edge, each of said panels being spaced such that a front side of a panel may abut a back side of a next adjacent panel, wherein said panels may selectively move between an open position and a closed position, wherein each of said vanes has a plurality of panels hingedly coupled thereto;

a drainage hole, said drainage hole extending through a bottom most portion of said arcuate depression; and a drainage pipe, said drainage pipe being fluidly coupled to said drainage hole and outwardly away from said base member.

\* \* \* \* \*